(12) United States Patent
Shrey et al.

(10) Patent No.: US 11,263,036 B2
(45) Date of Patent: Mar. 1, 2022

(54) METHOD AND DEVICE FOR CONTROLLING ACCESS OF APPLICATION

(71) Applicant: Samsung Electronics Co., Ltd., Suwon-si (KR)

(72) Inventors: Sridhar Shrey, BS. (IN); Naveen Kumar Singh, Ghaziabad (IN); Robin Ahuja, Panipat (IN); Jyotsna Sharma, Sec Pi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/444,395

(22) Filed: Jun. 18, 2019

(65) Prior Publication Data
US 2020/0019428 A1 Jan. 16, 2020

(30) Foreign Application Priority Data

Jul. 16, 2018 (IN) .............................. 201841026526
Apr. 26, 2019 (KR) ........................ 10-2019-0049299

(51) Int. Cl.
*G06F 9/451* (2018.01)
*G06F 9/455* (2018.01)
(Continued)

(52) U.S. Cl.
CPC .......... *G06F 9/45558* (2013.01); *G06F 9/451* (2018.02); *G06F 9/452* (2018.02);
(Continued)

(58) Field of Classification Search
CPC ........ G06F 9/455; G06F 9/45533; G06F 9/48; G06F 9/4843; G06F 9/485; G06F 9/50;
(Continued)

(56) References Cited

U.S. PATENT DOCUMENTS 8,943,506 B2   1/2015  Tang et al.
9,081,601 B2   7/2015  Tang
(Continued)

FOREIGN PATENT DOCUMENTS

JP         5441013 B2    3/2014
KR     10-1534784 B1    7/2015

OTHER PUBLICATIONS

Francescon et al, "X-MANO: An Open-Source Platform for Cross-Domain Management and Orchestration", 2017, IEEE, pp. 1-6. (Year: 2017).*

(Continued)

*Primary Examiner* — Charles M Swift
(74) *Attorney, Agent, or Firm* — Jefferson IP Law, LLP

(57) ABSTRACT

A method of controlling access of an application is provided. A server receives, from a device, a request to access a hybrid operating system interface (HOSI) for managing at least one application executed respectively on different operating systems (OSs), authenticates the device based on the request received to access the HOSI, determines an application corresponding to the request received from the device, from among the at least one application, when the device is authenticated, and transmits, to the device, data according to execution of the determined application.

7 Claims, 18 Drawing Sheets

(51) Int. Cl.
    *G06F 9/48* (2006.01)
    *G06F 9/50* (2006.01)
    *G06F 9/54* (2006.01)
    *H04L 29/06* (2006.01)

(52) U.S. Cl.
    CPC .......... *G06F 9/455* (2013.01); *G06F 9/45533* (2013.01); *G06F 9/48* (2013.01); *G06F 9/485* (2013.01); *G06F 9/4843* (2013.01); *G06F 9/50* (2013.01); *G06F 9/5005* (2013.01); *G06F 9/5077* (2013.01); *G06F 9/54* (2013.01); *G06F 9/547* (2013.01); *G06F 9/548* (2013.01); *H04L 63/0876* (2013.01); *G06F 2009/45587* (2013.01); *G06F 2009/45595* (2013.01)

(58) Field of Classification Search
    CPC .......... G06F 9/5005; G06F 9/54; G06F 9/547; G06F 9/548; G06F 9/451; G06F 9/452; G06F 9/45558; G06F 9/2077; G06F 2009/45587; G06F 2009/45595; H04L 63/0876
    See application file for complete search history.

(56) References Cited

U.S. PATENT DOCUMENTS

| | | | |
|---|---|---|---|
| 9,219,813 | B2 | 12/2015 | Deasy et al. |
| 9,247,042 | B2 | 1/2016 | Deasy et al. |
| 9,444,912 | B1 | 9/2016 | Chen et al. |
| 9,544,274 | B2 | 1/2017 | Deasy et al. |
| 9,823,819 | B1 | 11/2017 | Pashkov et al. |
| 10,511,674 | B2 * | 12/2019 | Xiao ................... G06F 9/45533 |
| 2010/0146504 | A1 | 6/2010 | Tang |
| 2011/0004878 | A1 * | 1/2011 | Divoux ............... G06F 9/45558 718/1 |
| 2011/0112819 | A1 | 5/2011 | Shirai et al. |
| 2011/0209064 | A1 * | 8/2011 | Jorgensen ......... H04W 12/0602 715/733 |
| 2011/0231840 | A1 * | 9/2011 | Burch .................. G06F 9/5077 718/1 |
| 2013/0167223 | A1 | 6/2013 | Prerna et al. |
| 2014/0032810 | A1 * | 1/2014 | Kanigicherla ........ G06F 9/4843 710/314 |
| 2014/0298420 | A1 | 10/2014 | Barton et al. |
| 2014/0372506 | A1 * | 12/2014 | Butner .................... H04L 67/04 709/203 |
| 2015/0113036 | A1 | 4/2015 | Hui et al. |
| 2015/0120807 | A1 | 4/2015 | Bharadwaj |
| 2015/0281227 | A1 * | 10/2015 | Fox Ivey .............. H04L 63/083 713/168 |
| 2015/0378704 | A1 * | 12/2015 | Davis ...................... H04L 67/16 709/217 |
| 2016/0065690 | A1 | 3/2016 | Hanyu et al. |
| 2016/0099948 | A1 * | 4/2016 | Ott ...................... H04L 63/0281 726/1 |
| 2016/0191604 | A1 * | 6/2016 | AbiEzzi .................. H04L 67/42 715/740 |
| 2017/0083354 | A1 * | 3/2017 | Thomas ................... H04L 67/24 |
| 2017/0185437 | A1 * | 6/2017 | Thomas .............. G06F 9/45558 |
| 2017/0201491 | A1 | 7/2017 | Schmidt et al. |
| 2018/0121030 | A1 * | 5/2018 | Hu ........................... G06F 9/452 |
| 2018/0307508 | A1 * | 10/2018 | Banerjee ................ G06F 9/452 |

OTHER PUBLICATIONS

International Search Report dated Sep. 30, 2019, issued in International Application No. PCT/KR2019/007340.

Liang et al.; vm0S: A virtualization-based, secure desktop system; Computers & Security 65 (2017) 323-343; ScienceDirect; www.sciencedirect.com; XP029918031; 2017; Beijing, CN.

Gebhardt et al.; Challenges for Inter Virtual Machine Communication; Technical Report; RHUL-MA-2010-12; Royal Holloway University of London; XP55823882; www.rhul.ac.uk/mathematics/techreports; Sep. 1, 2010; England.

European Search Report dated Jul. 22, 2021; European Appln. No. 19837931.5-1224 / 3818682 PCT/KR2019007340.

* cited by examiner

METHOD AND DEVICE FOR CONTROLLING ACCESS OF APPLICATION

CROSS-REFERENCE TO RELATED APPLICATION(S)

This application is based on and claims priority under 35 U.S.C. § 119 of an Indian patent application number 201841026526, filed on Jul. 16, 2018, in the Indian Patent Office and of a Korean patent application number 10-2019-0049299, filed on Apr. 26, 2019, in the Korean Intellectual Property Office, the disclosure of each of which is incorporated by reference herein in its entirety.

BACKGROUND

1. Field

The disclosure relates to an application management system. More particularly, the disclosure relates to a method, device, and server for handling access of an application.

2. Description of Related Art

Many enterprises (e.g., cooperative companies, partnerships, and educational institutions) allow users to access enterprise resources, such as hardware and software applications for e-mail, customer relationship management (CRM), document management, and enterprise resource planning (ERP), through enterprise networks. Users may use devices to access enterprise networks. In some cases, applications executed in a user device may exchange data through an enterprise network, and some of the data may be stored in a memory of the user device. Thus, there may be security problems for enterprises and users.

Also, while accessing applications of a plurality of operating systems (OSs) or a plurality of platforms, a user may want to operate by using an application executed on a first OS and share data through an application executed on a second OS. In order to share data between the first OS and the second OS, the user should first switch to another application of the second OS and then transmit a file through an application executed in the first OS, thus reducing the user experience. Also, the above method may allow the user device to log in the entire desktop and mobile device on a cloud, thus causing a security problem for a manager. Also, the user may receive a login request whenever accessing applications of a plurality of platforms.

Thus, it may be desirable to overcome the above limitations or other limitations or to provide at least useful alternatives.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method, device, and server for handling access of an application.

Another aspect of the disclosure is to provide a scheme for receiving an access request to a hybrid operating system interface (HOSI) from at least one user device.

Another aspect of the disclosure is to provide a scheme for identifying at least one application to be accessed as a device is authenticated.

Another aspect of the disclosure is to provide a scheme for retrieving metadata related to at least one identified application.

Another aspect of the disclosure is to provide a scheme for classifying and providing at least one identified application to a device.

Another aspect of the disclosure is to provide a scheme for sharing data between at least one application based on an instance of an application on an operating system (OS) instance.

Additional aspects will be set forth in part in the description which follows and, in part, will be apparent from the description, or may be learned by practice of the presented embodiments.

In accordance with an aspect of the disclosure, a method of controlling, by a server, access of an application is provided. The method includes receiving, from a device, a request to access a HOSI for managing at least one application executed respectively on different OSs, authenticating the device based on the received request to access the HOSI, determining an application corresponding to the request received from the device, from among the at least one application, when the device is authenticated, and transmitting, to the device, data according to execution of the determined application.

The request to access the HOSI may include identification information of the application corresponding to the received request, from among the at least one application.

The method may further include transmitting metadata of the executable at least one application to the device when the request to access the HOSI is received, wherein the application corresponding to the request received from the device may be determined based on the transmitted metadata.

The method may further include classifying the at least one application based on at least one of an OS type or a device type, and transmitting classification information regarding the at least one application.

The method may further include identifying whether an instance of the application corresponding to the received request is activated on an instance of an OS of the server, and transmitting a user interface (UI) corresponding to the instance of the application corresponding to the received request to a user device when the instance of the application is activated and calling instance of the OS corresponding to the application when the instance of the application is deactivated.

The method may further include receiving a request for data sharing between the executed application corresponding to the received request and another application from the device, determining, according to the received request for data sharing, memory path information of a memory storing data generated by the executed application corresponding to the received request, and sharing the generated data with the other application based on the determined memory path information.

The transmitting of the data according to the execution of the application corresponding to the received request may include receiving, from the device, an event command for the executed application corresponding to the received request; and transmitting data processed based on the event command to the device.

In accordance with another aspect of the disclosure, a method of controlling, by a device, access of an application is provided. The method includes determining, based on a user input, a HOSI for managing at least one application that is to be accessed and executed respectively on different OSs, transmitting a request to access the determined HOSI to a server including the HOSI, and receiving, from the server, data according to execution of an application determined from among the at least one application, based on the transmitted request, when the device is authenticated by the server.

The method may further include transmitting, to the server, a request for data sharing between the executed application and another application, wherein the data may be shared with the other application according to the request for data sharing based on memory path information of a memory storing data generated by the executed application.

In accordance with another aspect of the disclosure, a server for controlling access of an application is provided. The server includes a memory storing at least one instruction, a communicator, and at least one processor configured to execute the at least one instruction stored in the memory to control the communicator to receive, from a device, a request to access a HOSI for managing at least one application executed respectively on different OSs, authenticate the device based on the received request to access the HOSI, determine an application corresponding to the request received from the device, from among the at least one application, when the device is authenticated, and control the communicator to transmit, to the device, data according to execution of the determined application.

In accordance with another aspect of the disclosure, a non-transitory computer readable medium is provided. The non-transitory computer readable medium includes a recording medium storing program commands for commanding, when executed by at least one processor, the at least one processor to perform an operation of controlling access of an application, the operation of controlling the access of the application including receiving, from a device, a request to a access a HOSI for managing at least one application executed respectively on different OSs, authenticating the device based on the received request to access the HOSI, determining an application corresponding to the request received from the device, from among the at least one application, when the device is authenticated, and transmitting, to the device, data according to execution of the determined application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
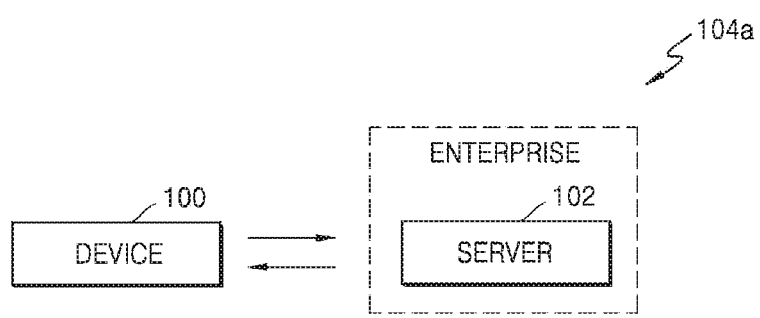
FIG. 1A is a schematic diagram of a system for handling access of an application, according to an embodiment of the disclosure.

Throughout the disclosure, the expression "at least one of a, b or c" indicates only a, only b, only c, both a and b, both a and c, both b and c, all of a, b, and c, or variations thereof.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. According, those of ordinary skill in the art will recognize that various changes and modifications of the various described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although terms such as "first" and "second" may be used herein to describe various elements, the elements should not be limited by the terms. These terms are only used to distinguish one element from another element. For example, without departing from the scope of the disclosure, a first element may also be referred to as a second element, and similarly, a second element may also be referred to as a first element. As used herein, the term "and/or" includes any and all combinations of one or more of the associated listed items.

Throughout the specification, when something is referred to as "including" an element, another element may be further included unless specified otherwise. Also, the term "unit" used herein may mean a software element or a hardware element such as a field-programmable gate array (FPGA) or an application-specific integrated circuit (ASIC), and the "unit" may perform some functions. However, the "unit" is not limited to software or hardware. The "unit" may be formed so as to be in an addressable storage medium, or may be formed so as to operate one or more processors. Thus, for example, the "unit" may include elements such as software elements, object-oriented software elements, class elements, and task elements, and may include processes, functions, attributes, procedures, subroutines, segments of program code, drivers, firmware, micro codes, circuits, data, databases, data structures, tables, arrays, and variables. A function provided in the elements and "units" may be combined into the smaller number of elements and "units", or may be further divided into additional elements and "units".

Also, all "units" of the disclosure may be controlled by at least one processor, and at least one processor may perform an operation performed by the "unit" of the disclosure.

Also, portions irrelevant to the description of the disclosure will be omitted in the drawings for a clear description of embodiments of the disclosure, and like reference numerals will denote like elements throughout the specification.

Throughout the specification, when an element is referred to as being "connected" to another element, it may be "directly connected" to the other element or may be "electrically connected" to the other element with one or more intervening elements therebetween.

The word "example" may be used herein to mean "used as an example or illustration". Any embodiment of the disclosure described herein as an "example" is not necessarily to be construed as desirable, or to be construed as advantageous over other embodiments of the disclosure.

Embodiments of the disclosure may be described from the viewpoint of functions or blocks performing functions. Blocks that may be referred to as "units" or "modules" of the disclosure may be physically implemented by analog or digital circuits such as logic gates, integrated circuits, microprocessors, microcontrollers, memories, passive electronic components, active electronic components, optical components, and/or hardwired circuits, and may optionally be driven by firmware and software.

Embodiments of the disclosure may be implemented by using at least one software program executed on at least one hardware device, and may perform a network management function to control elements.

According to embodiments of the disclosure, a user may need to switch a device or mode to access applications operating in different platforms or operating systems (OSs) (e.g., Linux® platform, Windows® platform, and Android® platform). According to embodiments of the disclosure, the user may access applications of different platforms or OSs without making any change. The user may be provided with a secure business workspace including a desktop and a mobile application. According to embodiments of the disclosure, an operation of a manager (i.e., an IT manager) maintaining and managing the user's workspace may be simplified. Also, a manager policy support may be improved to provide a role-based access to the user.

According to embodiments of the disclosure, data may be shared between applications without switching a device or mode, regardless of whether the applications operate in the same OS (or platform) or different OSs (or platforms).

According to embodiments of the disclosure, a device may directly interact with an application in a simple manner even without knowing the background implementation of a server. Also, the device may remotely access a virtualized application executed in at least one of a virtual desktop infrastructure (VDI) or a virtual mobile infrastructure (VMI).

According to an embodiment of the disclosure, the user of a device 100 may log in one of VDI/VMI applications. When the device 100 is authenticated, a session may be generated and thereafter the session may be maintained for all applications regardless of VDI/VMI (or platform) and thus the user may easily access all the applications. Also, the IT manager may apply a policy to all platforms on a server 102. Thus, the IT manager may manage a system accurately and quickly.

In embodiments of the disclosure, a sharing and copying function may be integrated with drag-and-drop, and thus the device may quickly access an application. Methods according to embodiments of the disclosure may be used in various domains (e.g., banking domains, financial domains, healthcare domains, and security domains).

An OS and platform of the disclosure may be interchangeably used in the disclosure. Also, a hybrid operating system interface (HOSI) of the disclosure may be implemented in hardware or software, and may be controlled by at least one processor.

An HOSI or application to be accessed (i.e., as an access target) in the disclosure may be located and operated (executed) on the server, and an HOSI or application that is the same as that located on the server may be located in a session-connected device.

Hereinafter, embodiments of the disclosure will be described in detail with reference to the accompanying drawings.

FIG. 1A is a schematic diagram of a system for handling access of an application, according to an embodiment of the disclosure.

Referring to FIG. 1A, a system 104a may include a device 100 and a server 102. However, this is merely an example, and the system 104a may include more elements than the above elements. The device 100 of a user may transmit a request for access of at least one application to the server 102. The applications may be application programs designed to perform particular operations and may include, for example, messaging applications, social networking applications, shopping applications, game applications, chatting applications, multimedia applications, ticket reservation applications, video applications, music applications, e-mail applications, and finance-related applications. Also, the applications may be classified as mobile applications, desktop applications, or the like depending on device execution environments. The applications may be executed in different platforms (e.g., Linux® platform, Windows® platform, and Android® platform) or different OSs.

According to an embodiment of the disclosure, the server 102 may receive an access request of the user to at least one HOSI from the device 100. After receiving the access request, the server 102 may authenticate the device 100. For example, the server 102 may authenticate the device 100 based on the authentication information of the device 100 included in the access request of the device 100. As the device 100 is authenticated, the server 102 may identify at least one application that is executable.

According to an embodiment of the disclosure, the server 102 may retrieve metadata related to the identified at least one application. The metadata according to an embodiment of the disclosure may be a set of information related to the application to be accessed by the user and may include, for example, a graphical representation of the identified application, an icon thereof, the name of the application, and the identification information of the application. The server 102 may transmit the retrieved metadata related to at least one application to the device 100. The server 102 may determine the application access-requested from the device 100 based on the metadata. However, this is merely an example, and when an application identifier is included in the access request, the server 102 may determine the access-requested application without retrieving the metadata.

According to an embodiment of the disclosure, the server 102 may control access of at least one identified application and update data related to the application, based on the policy thereof. According to an embodiment of the disclosure, the policy of the disclosure may be for an IT manager to identify and manage different platforms (e.g., Linux® platform, Windows® platform, Android® platform, and Knox® platforms), different OSs, and applications operating on different platforms or OSs.

According to an embodiment of the disclosure, based on the policy, the server 102 may identify the access-requested application based on the metadata and control access of the identified application. In general, a platform-by-platform update was required to update the policy; however, according to embodiments of the disclosure, the policy may be updated in real time by the IT manager, and at least one application to be accessed may be updated automatically or manually based on the policy. Thus, the IT manager according to embodiments of the disclosure may simplify operations and reduce security risks.

According to an embodiment of the disclosure, the server 102 may classify at least one executable application based on at least one of an OS type or a type of the device 100 and transmit the classification information thereof to the device 100, together with the metadata.

According to an embodiment of the disclosure, the server 102 may control basic operations of the OS based on various events (detailed operations of various elements in the server will be described in detail with reference to FIG. 3).

The device 100 may be, for example, a cellular phone, a smart phone, a personal digital assistant (PDA), a tablet computer, a laptop computer, a smart watch, or smart glass but is not limited thereto.

Figure 1B:
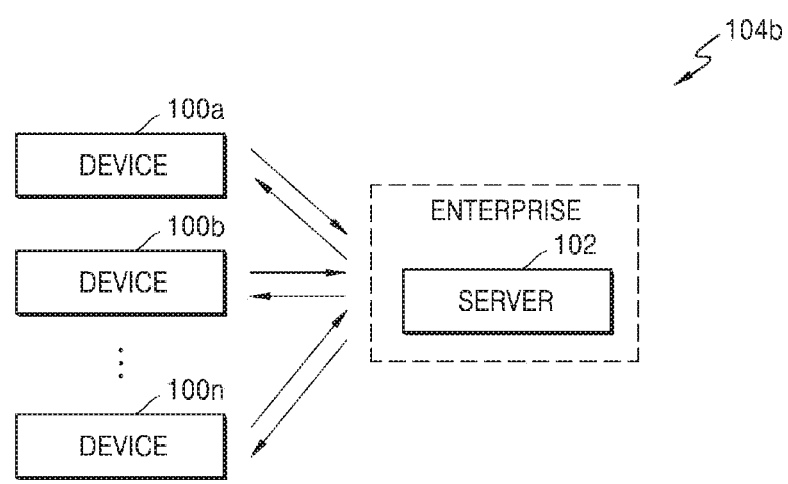
FIG. 1B is a schematic diagram of a system for handling access of an application, according to an embodiment of the disclosure.

FIG. 1B is a schematic diagram of a system for handling access of an application, according to an embodiment of the disclosure.

Referring to FIG. 1B, a system 104b may include at least one device 100a to 100n and a server 102. The at least one device 100a to 100n may transmit an access request for at least one application to the server 102. Also, according to the access request for at least one application from at least one device 100a to 100n (hereinafter, the label of the device will be denoted as 100), the server 102 may perform various operations and functions for processing access to the application as illustrated in FIG. 1A. Also, the server 102 may manage the authentication information of at least one device 100a to 100n and may authenticate an access-requesting device based on the stored authentication information when an access request for an HOSI is received.

Although FIGS. 1A and 1B illustrate various hardware components of the systems 104a and 104b, other embodiments of the disclosure are also not limited thereto. According to an embodiment of the disclosure, the systems 104a and 104b may include fewer or more components than the illustration. Also, the label or name of each component is merely an example and does not limit the scope of the disclosure.

The arrows in FIGS. 1A and 1B indicate that data is transmitted between the device 100 and the server 102, and all data communication may be performed through a communicator (e.g., transceiver) in each device.

Figure 2:
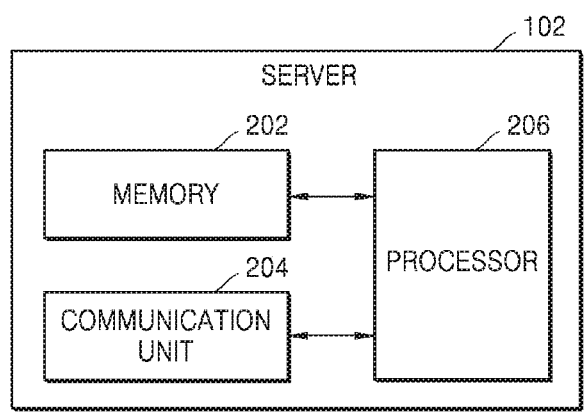
FIG. 2 is a block diagram illustrating a structure of a server according to an embodiment of the disclosure.

FIG. 2 is a block diagram illustrating a structure of a server according to an embodiment of the disclosure.

Referring to FIG. 2, the server 102 may include a memory 202, a communicator 204, and a processor 206.

According to an embodiment of the disclosure, the memory 202 may store, for example, metadata related to at least one application, data information processed from the executed application, and commands for controlling various elements of the server. Various elements of the server according to embodiments of the disclosure may include, for example, a main controller, a management controller, and an HOSI controller. Operations relating to the various elements of the server will be described below in more detail with reference to FIGS. 3 and 4.

Also, the communicator 204 may include at least one element enabling communication with another device and may include, for example, at least one of a short-range communication module, a wired communication module, or a wireless communication module. The server 102 may transmit data through the communicator 204 and the device 100.

According to an embodiment of the disclosure, the processor 206 may execute commands stored in the memory 202 and perform various processes. Also, the processor 206 may execute commands stored in the memory 202 to control various elements. Various elements in the server 102 may operate to perform embodiments of the disclosure, and each of the operations performed by the various elements may be performed by the processor 206. Also, the memory 202 and the communicator 204 may be connected to and interact with the processor 206. The operation of the processor 206 will be described below in more detail with reference to FIGS. 3 to 11.

Figure 3:
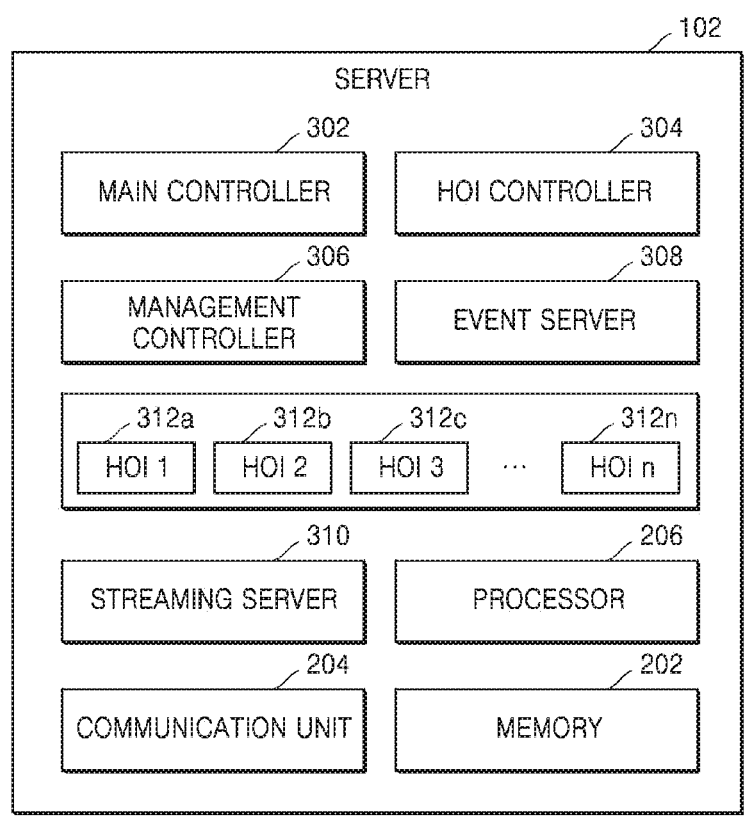
FIG. 3 is a block diagram illustrating a structure of a server according to embodiment of the disclosure.

FIG. 3 is a block diagram illustrating a structure of a server according to another embodiment of the disclosure.

Referring to FIG. 3, the server 102 may include a main controller 302, a HOSI controller 304, a management controller 306, an event server 308, HOSIs 312a to 312n (hereinafter, referred to as 312), a communicator 204, and a memory 202.

The main controller 302 may receive an access request from the device 100. In this case, the main controller 302 may function as an interface between the HOSI controller 304 and the device 100. For example, the main controller 302 may interpret the access request received from the device 100 and then transmit the received access request to the HOSI controller 304 and the event server 308.

The HOSI controller 304 may receive an access request of the user for accessing at least one HOSI (e.g., 312a to 312n) and an application (i.e., a mobile application or a desktop application) from the device 100 and authenticate the access request and the device 100. Thereafter, the HOSI controller 304 may identify at least one executable application as it authenticates the access request and the device 100. The authentication process thereof will be described below in more detail with reference to FIG. 8. Also, the HOSI controller 304 may retrieve metadata related to at least one identified application and transmit the retrieved metadata to the device 100. Thereafter, the HOSI controller 304 may determine the application access-requested from the device 100 based on the metadata.

According to an embodiment of the disclosure, the policy may be updated in real time by the IT manager, and the HOSI controller 304 may control, based on the policy, access to at least one identified application and update data related to the application.

According to an embodiment of the disclosure, the HOSI controller 304 may manage an HOSI (e.g., 312a) that manages at least one application. Also, the HOSI controller 304 may maintain a session database (DB) (not illustrated) for identifying an authentication token between the device 100 and the server 102 and a session related to the device 100.

According to an embodiment of the disclosure, depending on whether an instance of the access-requested application is activated on an instance of the OS of the server 102, the HOSI controller 304 may transmit a user interface (UI) corresponding to the instance of the application to the device 100 through the communicator 204 or call an OS instance corresponding to the application (an operation of transmitting the UI or calling the OS instance will be described in detail with reference to FIG. 8).

According to an embodiment of the disclosure, the HOSI controller 304 may share data between at least one application based on memory path information in the memory 202 storing data generated in the executed application. According to an embodiment of the disclosure, by receiving a file sharing request from a first application among at least one application, receiving a memory path information message from the memory 202, and sharing the memory path information with a second application among the at least one application, data may be shared between different applications (an operation of sharing data between different applications will be described in detail with reference to FIGS. 10 and 11).

According to an embodiment of the disclosure, the HOSI controller 304 may control basic operations of the OS based on various events. The basic operations may include, for example, a business logic operation, a start operation, a stop operation, and a restart operation. The events may occur according to a user request or a policy preset in the application. For example, the events may include, but are not limited to, create/start/stop/resume_machine events, modify_machine_config events, set/get_user_personalization events, install/get_application events, set/get_shared_data_disk_location events, start_application events, read_display_buffer events, and inject_remote_event events.

According to an embodiment of the disclosure, in the create/start/stop/resume_machine event, the OS and hardware (virtual) level may be called to start, stop, or restart the server 102. In the modify_machine_config event, other parameter virtualization tools such as allocated RAM, data disk size, CPU, and VBox may be edited. In the set/get_user_personalisation event, user basic settings such as theme/color schemes of all applications may be set. In the install/get_application event, a URI address of a supported application package may be acquired to install a certain application or return a metadata list of all applications installed in a particular OS. In this case, the metadata list may include, for example, icons and application names. In the set/get_shared_data_disk_location event, a shared data disk position may be set (or acquired), and the shared data disk position may be required for data sharing.

According to an embodiment of the disclosure, in the start_application event, an application to be started may be identified through the application name and the identified application may be started according to the platform. In the read_display_buffer event, information for UI display of the OS may be transmitted to the device 100, and in the inject_remote_event, an UI event (e.g., a touch event, a scroll event, or a key event) may be injected into the OS and then executed.

According to an embodiment of the disclosure, the main controller 302 may request the HOSI controller 304 for metadata related to the application of the device 100. In this case, the HOSI controller 304 may call the get_installed_application on all HOSI instances to which the user has subscribed. On each OS, the HOSI may read the metadata of the installed application and return the read metadata to the HOSI controller 304. Thereafter, the HOSI controller 304 may integrate the metadata of the application and return the integrated metadata to the main controller 302, and the main controller 302 may transmit the result about the application to the device 100 through the communicator 204. Also, except an event injection API, the HOSI controller 304 may handle execution of all APIs of the HOSI 312.

According to an embodiment of the disclosure, the event server 308 may inject a UI event into an OS instance and may transmit the changed UI information to a streaming server 310 according to the OS instance injection.

Also, the event server 308 may translate the language of the UI event to correspond to a particular platform. For example, the event server 308 may translate the language into the language of a hosted platform when the UI event is in the language form of the Android® platform. Likewise, when the UI event is the language of the Windows® platform, the event server 308 may translate the language into the language of the Android® platform.

According to an embodiment of the disclosure, the management controller 306 may inject a certain policy into suitable components of the OS. In this case, because the policy is injected into the suitable components, the manager may control the OS and application on the server 102, thereby improving security.

Although FIG. 3 illustrates various elements of the server 102, it should be understood that the disclosure is not limited thereto. According to an embodiment of the disclosure, the server 102 may include fewer or more components than the illustration. Also, the label or name of each component is merely an example and does not limit the scope of the disclosure. At least one element of FIG. 3 may be combined together to perform the same or substantially similar functions for processing access of an application in the server 102.

Figure 4:
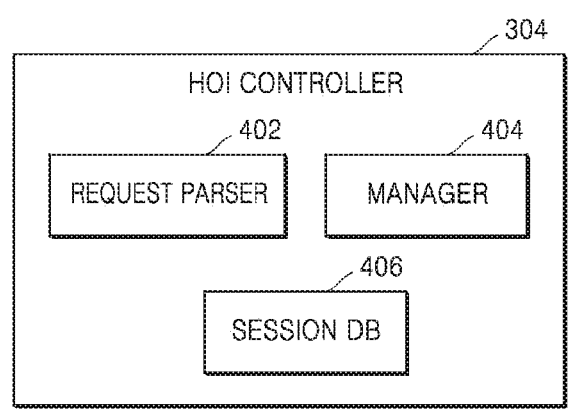
FIG. 4 is a block diagram illustrating a structure of a hybrid operating system interface (HOSI) controller, according to an embodiment of the disclosure.

FIG. 4 is a block diagram illustrating a structure of a HOSI controller, according to an embodiment of the disclosure.

Referring to FIG. 4, the HOSI controller 304 may include a request parser 402, a manager 404, and a session DB 406.

According to an embodiment of the disclosure, the session DB 406 may store information about the device 100 and the session of an HOSI (e.g., 312a) mapped/assigned to the device 100 and the authentication token or the authentication information of the device 100. The HOSI controller 304 may manage the session DB 406 and may authenticate an access-requesting device based on the authentication information stored in the session DB 406 when an access request for the HOSI is received. Also, a session may be generated as the device is authenticated. In this case, the HOSI controller 304 may authenticate the device based on the authentication token stored in the session DB 406 when an event is generated by the user from the device.

According to an embodiment of the disclosure, the request parser 402 may analyze and parse a request of the main controller 302 and return the same to the HOSI controller 304. Also, the manager 404 may actually call an API requested by the HOSI controller 304.

Although FIG. 4 illustrates various elements of the HOSI controller 304, it should be understood that other embodiments of the disclosure are not limited thereto. In other embodiments of the disclosure, the server 102 may include fewer or more elements than the illustration. Also, the label or name of each element is merely an example and does not limit the scope of the disclosure. In the HOSI controller 304, at least one element may be combined together to perform the same or substantially similar function to control access of applications.

Figure 5:
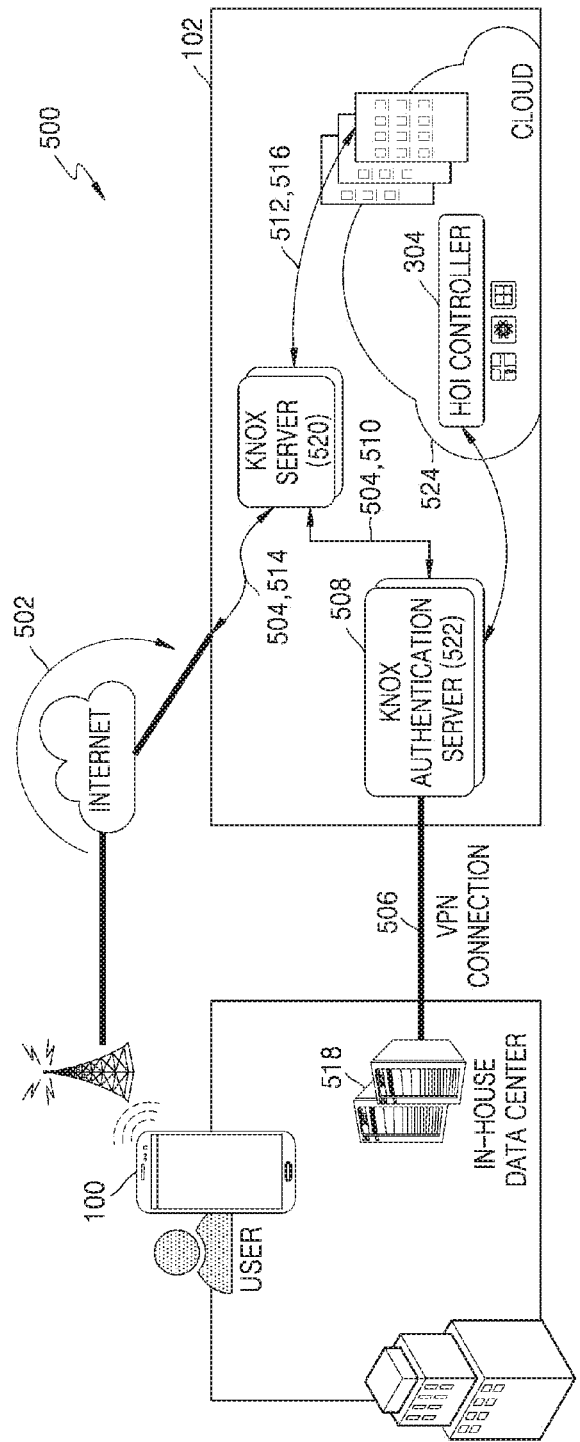
FIG. 5 is a diagram illustrating a method of handling access of an application, according to an embodiment of the disclosure.

FIG. 5 is a diagram illustrating a method of handling access of an application, according to an embodiment of the disclosure.

Referring to FIG. 5, a system 500 may include a device 100, a server 102, an in-house data center 518, a Knox (Knox®) server 520, a Knox authentication server 522, and a cloud 524.

The device 100 may transmit an access request (502) for an HOSI (e.g., 312a) to the Knox server 300 through the Internet. Thereafter, authentication (504) of the device 100 may be performed by the Knox server 520 and the Knox authentication server 522 based on the access request. Also, when the authentication (504) is completed, a virtual private network (VPN) connection (506) may be set between the Knox authentication server 522 and the in-house data center 518. In this case, the Knox server 520 and the Knox authentication server 522 may facilitate communication between the device 100 and the backend infrastructure of the server 102. The Knox server 520 and the Knox authentication server 522 may also be referred to as a web server. The web server may include middleware (not illustrated) that generates, reads, and updates a user account and manages a deletion operation. Also, the Knox server 520 and the Knox authentication server 522 may implement a business logic in association with a user's access to an application and an HOSI (e.g., 312a).

The Knox server 520 and the Knox authentication server 522 may store information related to a data access mechanism and an authentication mechanism for the device 100, and the server 102 may provide virtual OSs of various platforms.

After the VPN connection (506) is set, the Knox authentication server 522 may generate and start a virtual machine instance (VM instance) (508). When the VM instance (508) information is generated, the Knox authentication server 522 may transmit the VM instance information (510) generated by the Knox authentication server 522 to the Knox server 520.

The server 102 may transmit a video stream (512) for the application to the Knox server 520 on the cloud 524. Thereafter, a video output (514) may be transmitted from the Knox server 520 to the device 100. According to an embodiment of the disclosure, an input (516) from the device 100 may be transmitted to the server 102.

Figure 6:
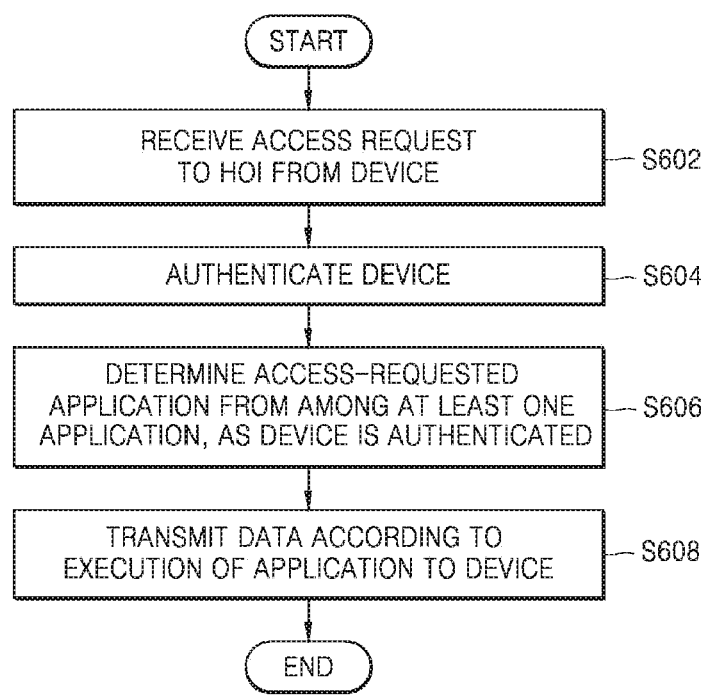
FIG. 6 is a flowchart illustrating a method of handling access of an application, according to embodiment of the disclosure.

FIG. 6 is a flowchart illustrating a method of handling access of an application, according to another embodiment of the disclosure.

Referring to FIG. 6, in operation S602, the server 102 may receive an access request of the user to a HOSI (e.g., 312a) from the device 100. In this case, the access request to the HOSI (e.g., 312a) may or may not include identification information of an application that the user wants to access.

In operation S604, the server 102 may authenticate the device 100 upon receiving the access request to the HOSI (e.g., 312a). According to an embodiment of the disclosure, authentication information for authenticating the device 100 may be predetermined and stored in a database form in the session DB 406. The server 102 may compare information of the device 100 with the authentication information stored in the session DB 406, and when the information matches, the server 102 may prepare to execute the application. In this case, the server 102 may identify at least one application executable on the server 102 and retrieve metadata related to the identified at least one executable application. On the other hand, when the information of the device 100 does not match the authentication information stored in the session DB 406, the server 102 may request a procedure for authenticating the device 100. Various techniques for authentication between devices may be used for the procedure for authenticating the device 100, and thus redundant descriptions thereof will be omitted for conciseness.

In operation S606, the server 102 may determine an access-requested application among at least one executable application as the device 100 is authenticated. In this case, the server 102 may identify at least one application executable on the server 102 and retrieve metadata related to the identified at least one executable application.

According to an embodiment of the disclosure, when identification information of the application to be accessed is included in the access request to the HOSI (e.g., 312a), the server 102 may determine the access-requested application among the executable applications based on the identification information. On the other hand, according to an embodiment of the disclosure, when the identification information of the application to be accessed is not included in the access request to the HOSI (e.g., 312a), the server 102 may transmit metadata related to at least one identified executable application to the device 100. Thereafter, the user may transmit an access request for a particular application to the server 102 through the device 100, and the server 102 may determine an access-requested application.

In operation S608, the server 102 may execute the determined application and transmit data according to the execution to the device 100.

According to an embodiment of the disclosure, the server 102 may classify an executable application based on at least one of an OS type or a device type before an access request to the HOSI (e.g., 312a) is made. For example, the server 102 may classify an application of a mobile device (not illustrated) and an application of a desktop (not illustrated). Thereafter, the server 102 may transmit the classification information thereof to the device 100. An operation of classifying the executable application may be performed in real time even after the access request to the HOSI (e.g., 312a) is received, and thus the classification information may be transmitted to the device 100.

Figure 7:
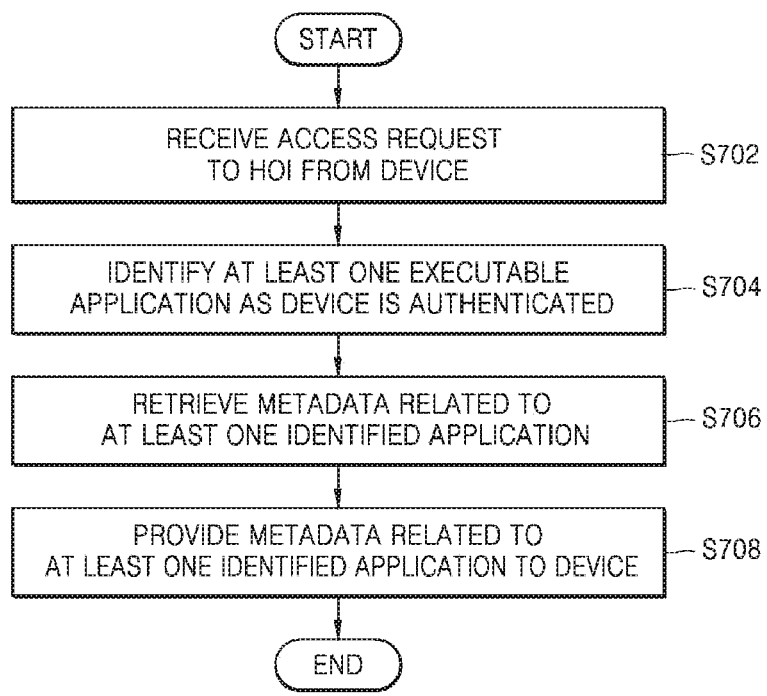
FIG. 7 is a flowchart illustrating a method of handling access of an application, according to embodiment of the disclosure.

FIG. 7 is a flowchart illustrating a method of handling access of an application, according to another embodiment of the disclosure.

Referring to FIG. 7, in operation S702, the server 102 may receive an access request of the user to a HOSI (e.g., 312a) from a device. In this case, the access request may not include identification information of an application to be accessed.

In operation S704, the server 102 may authenticate the device and identify at least one executable application as it authenticates the device.

Next, in operation S706, the server 102 may retrieve metadata related to the identified at least one executable application. The metadata according to an embodiment of the disclosure may be a set of information related to the application to be accessed by the user and may include, for example, a graphical representation of the identified application, an icon thereof, the name of the application, the identification information of the application, and the application list.

In operation S708, the server 102 may provide the metadata related to at least one identified application to the device. In this case, the server 102 may classify the application based on at least one of the OS type or the device type and transmit the classification information thereof to the device. According to an embodiment of the disclosure, based on the classification information, the device may present, to the user, the metadata provided by the server 102 in a user-recognizable form such as an icon on the display. Thereafter, the user may transmit an access request for a particular application to the server 102 through the device 100, and the server 102 may determine and execute the access-requested application.

Figure 8:
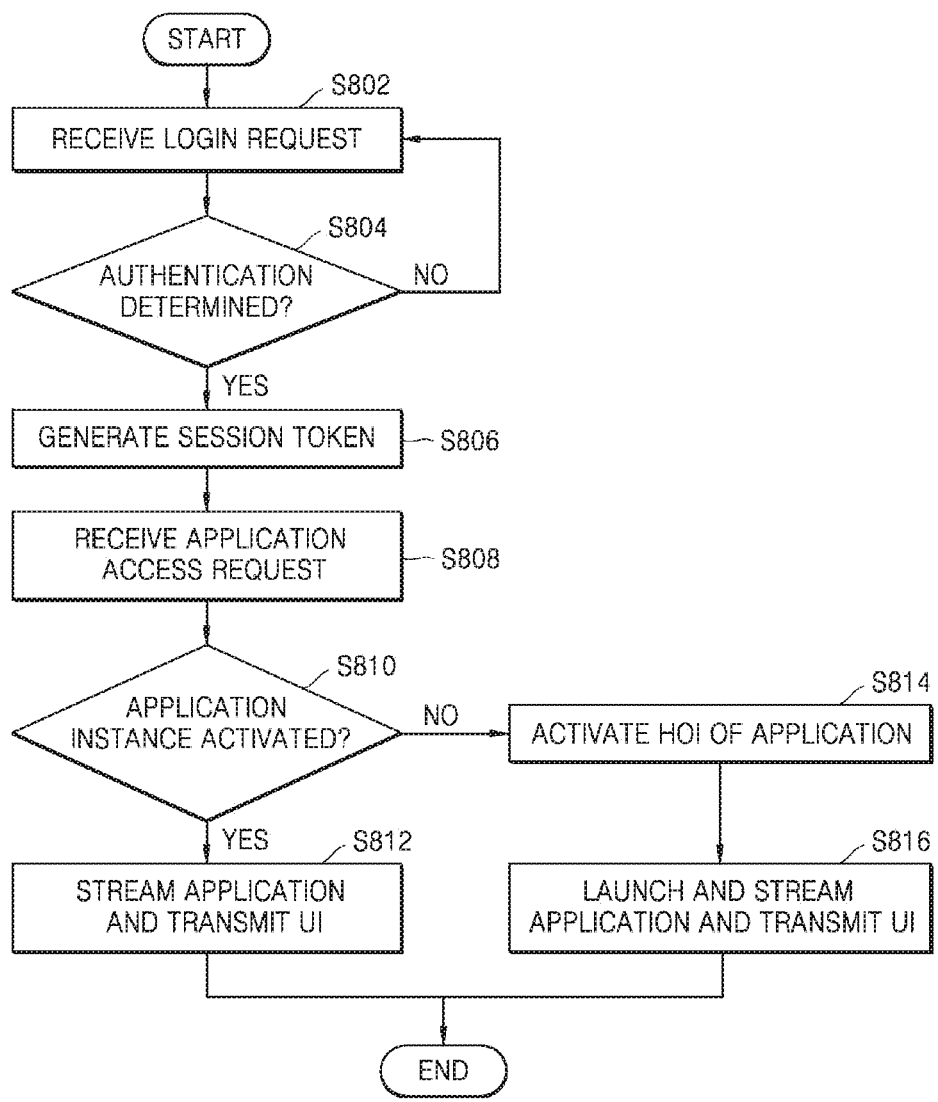
FIG. 8 is a flowchart illustrating a method of streaming an application, according to an embodiment of the disclosure.

FIG. 8 is a flowchart illustrating a method of streaming an application, according to an embodiment of the disclosure.

Referring to FIG. 8, in operation S802, the server 102 may receive a login request from a device. As the login request is received, the server 102 may request the device 100 for an authentication means for login. According to an embodiment of the disclosure, the login to the server 102 may correspond to the authentication of the device. For example, the authentication means may include, but is not limited to, password, pattern, voice, fingerprint, iris, or face recognition. Thereafter, the user may input authentication information corresponding to a predetermined authentication means to the device according to the authentication means request of the server 102, and the server 102 may receive the authentication information inputted by the user.

In operation S804, when the authentication information is input from the user, the server 102 may determine whether the device is authenticated. When the authentication information is inputted from the user, the server 102 may compare the input authentication information with predetermined authentication information for authenticating the device; and when the input authentication information matches the predetermined authentication information, the server 102 may generate a session for connection with the device. When the input authentication information does not match the predetermined authentication information, the server 102 may again request the device for an authentication means for login.

In operation S806, when the device is authenticated, the server 102 may generate a session for connection with the device and generate a session token. Thereafter, the device may request access to the application by using the generated session token or may transmit a separate request, such as a request for termination of the executed application, to the server 102 without an additional authentication procedure.

Next, in operation S808, the server 102 may receive an access request for the application. In this case, the access request may be an access request including identification information of the application. On the other hand, the access request may be an access request corresponding to an application that is accessed-requested by the user after metadata is provided by the server 102.

In operation S810, the server 102 may determine whether an instance of the access-requested application is activated on an OS instance of the server 102.

In operation S812, when the instance of the access-requested application is activated, the server 102 may stream the access-requested application and transmit a user interface (UI) corresponding to the instance of the access-requested application to the device. Thereafter, the device may display the transmitted UI through a display of the device.

On the other hand, in operation S814, when the instance of the access-requested application is deactivated, the server 102 may activate a HOSI corresponding to the access-requested application and call an OS corresponding to the access-requested application. In operation S816, when the OS is called, the server 102 may launch and stream the access-requested application and transmit a user interface (UI) to the device. Thereafter, the device may display the transmitted UI through a display of the device.

Various operations, actions, blocks, and steps in the flowchart of FIG. 8 may be performed in the described order, in a different order, or simultaneously. Also, in embodiments of the disclosure, some of the operations, actions, blocks, and steps may be omitted, added, or modified without departing from the scope of the disclosure.

Figure 9:
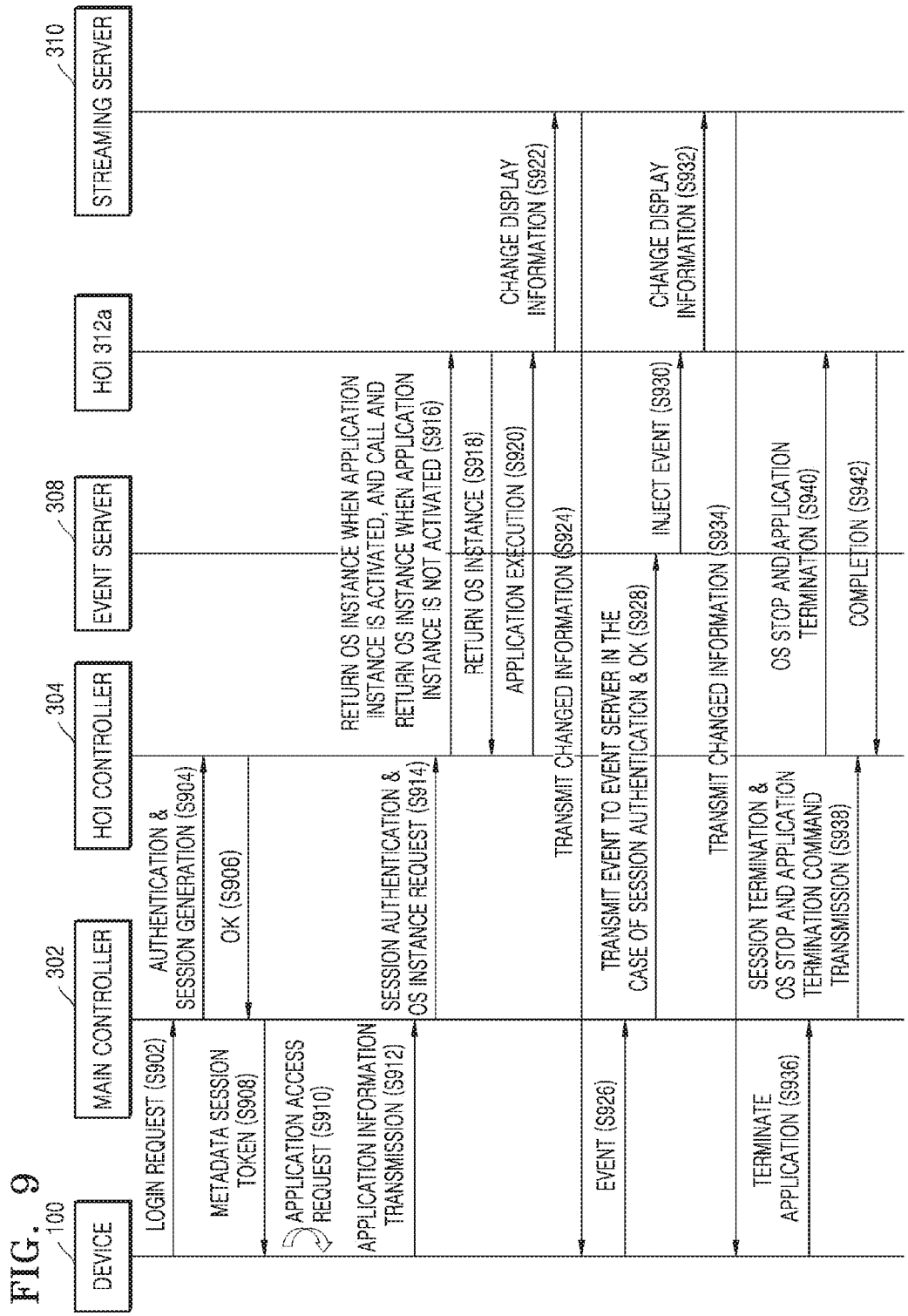
FIG. 9 is a flowchart illustrating various operations for streaming an application, according to an embodiment of the disclosure.

FIG. 9 is a flowchart illustrating various operations for streaming an application, according to an embodiment of the disclosure.

Referring to FIG. 9, in operation S902, a login request may be transmitted from the device 100 to the main controller 302 of the server 102. The operation of the user, the device 100, and the server 102 corresponding to the login request may correspond to operation S802.

In operation S904, the main controller 302 of the server 102 may request the HOSI controller 304 to determine the authentication of the device 100 based on the predetermined authentication information and the authentication information input by the user. In this case, determining whether the device 100 is authenticated may correspond to operation S804. In operation S906, when the device 100 is authenticated, the HOSI controller 304 may notify that the authentication of the device 100 is completed.

In operation S908, when the authentication is completed, a session for connection with the device 100 may be generated and the main controller 302 may transmit a session token and metadata related to at least one executable application to the device 100.

In operation S910, based on the transmitted metadata, the user may transmit an access request for a particular application through the device 100.

In operation S912, access request-related information may be transmitted to the main controller 302.

In operation S914, the main controller 302 may identify the session token to identify that the session is connected to the device 100 and may transmit an OS instance request corresponding to the access-requested application to the HOSI controller 304.

In operation S916, the HOSI controller 304 may determine whether the access-requested application instance is activated, and when the application instance is activated by an HOSI (e.g., 312a), the OS instance corresponding to the access-requested application may be returned to the HOSI controller 304, and when the application instance is deactivated, a request for calling and returning the OS instance corresponding to the access-requested application may be transmitted thereto.

Next, in operation S918, the HOSI (e.g., 312a) returns the OS instance to the HOSI controller 304 at the request of the HOSI controller 304. In this case, operations S916 and S918 may correspond to operations S810 and S814. In operation S920, when the OS instance is returned, the HOSI controller 304 may transmit a request for execution of the access-requested application to the HOSI (e.g., 312a).

In operation S922, when the access-requested application is executed on the HOSI (e.g., 312a), the HOSI (e.g., 312a) may transmit the changed display information to the streaming server 310 according to the UI information change.

Next, in operation S924, the streaming server 310 may transmit the changed display information to the device 100, and the device 100 may display the UI information on the display of the device 100 based on the transmitted display information.

In operation S926, when a UI event (e.g., a touch event, a scroll event, or a key event) is generated, the device 100 may transmit the generated UI event to the main controller 302.

Next, in operation S928, the main controller 302 may authenticate the session and transmit the UI event generated based on the authentication to the event server 308.

In operation S930, the event server 308 may inject the event into the HOSI (e.g., 312a), and in operation S932, the HOSI (e.g., 312a) may transmit the changed display information to the streaming server 310 according to the UI information change by the generated UI event.

Next, in operation S934, the streaming server 310 may transmit the changed display information to the device 100, and the device 100 may display the UI information on the display of the device 100 based on the transmitted display information.

In operation S936, when the user terminates the executed application being executed, the device 100 may transmit, to the main controller 302, a request for stopping the executed OS and terminating the application. Next, in operation S938, when the application termination request is transmitted, the main controller 302 may terminate the session and transmit a command for stopping the executed OS and terminating the application.

In operation S940, the HOSI controller 304 may transmit, to the HOSI (e.g., 312a), the command for stopping the executed OS and terminating the application.

Next, in operation S942, the HOSI (e.g., 312a) may transmit a message indicating the completion of the OS stop and the application termination to the HOSI controller 304.

Various operations, actions, blocks, and steps in the flowchart of FIG. 9 may be performed in the described order, in a different order, or simultaneously. Also, in embodiments of the disclosure, some of the operations, actions, blocks, and steps may be omitted, added, or modified without departing from the scope of the disclosure.

Figure 10:
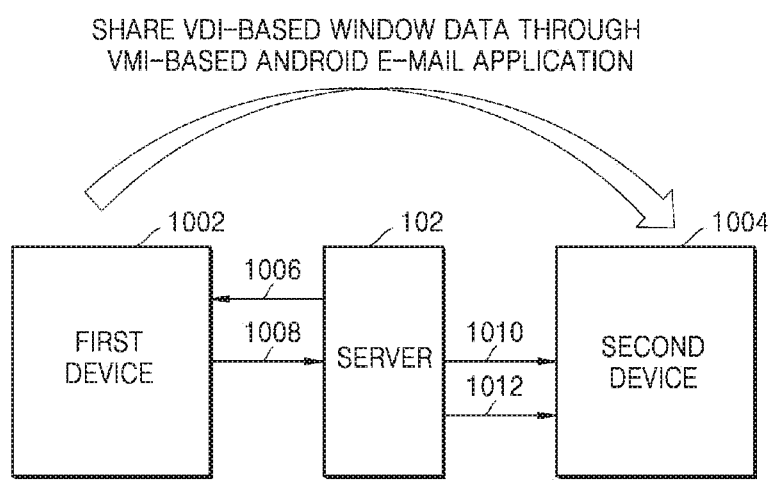
FIG. 10 is an example diagram for describing a method of sharing data between applications of different platforms according to an embodiment of the disclosure.

FIG. 10 is an example diagram for describing a method of sharing data between applications of different platforms.

In order to share data between applications executed in different platforms (or devices or OSs), authentication may be performed in each platform and a file in one platform may be transmitted to another platform after the authentication is completed and thus the user may transmit the file from one platform to another platform. In this case, authentication should be performed in all platforms sharing data and the user experience may be reduced.

In some cases, data existing on a local system may be accessed through a VDI; however, when data is not directly downloaded on the user device, it may not be shared in a VMI-based application.

Referring to FIG. 10, a first device 1002 and a second device 1004 may operate based on different platforms (e.g., the first device may operate on a VDI-based Windows® platform and the second device may operate on a VMI-based Android® platform), and the user may share, through the server 102, data generated in an application executed on the first device 1002 in an application executed on the second device 1004. When the user desires to share the data generated in the application on the first device 1002 in the application on the second device 1004, the following process may be required to share the data.

The server 102 may transmit, to the first device 1002, a request 1006 for executing a first application executable on the first device 1002 and generating a report related to the first application. In this case, the report may include previously-executed records for the executed application and data generated during the execution. Thereafter, a report 1008 generated from the first device 1002 may be transmitted to the server 102. The server 102 may transmit a report 1010 received from the first device 1002 to the second device 1004, and the second device 1004 may share data 1012 based on the transmitted report.

Figure 11:
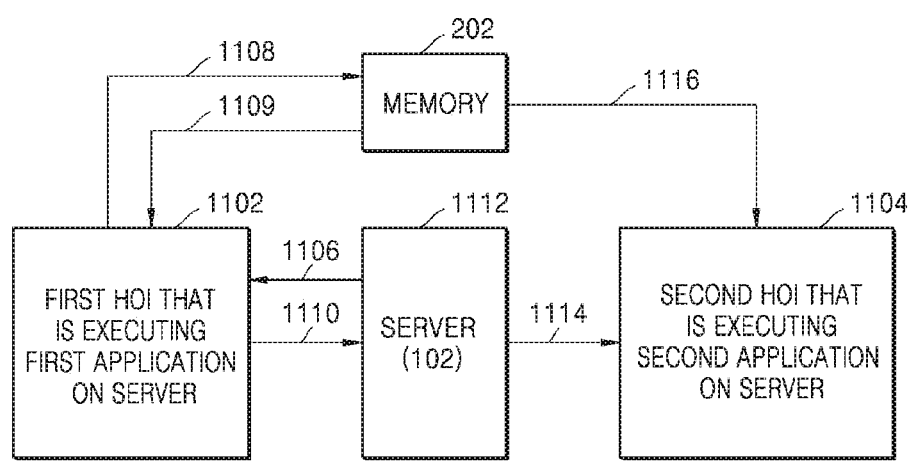
FIG. 11 is an example diagram for describing a method of sharing data between applications of different platforms, according to an embodiment of the disclosure.

FIG. 11 is an example diagram for describing a method of sharing data between applications of different platforms, according to an embodiment of the disclosure.

Referring to FIG. 11, the first application and the second application of FIG. 11 may be executed in different HOSIs (e.g., 312a) of the server 102. The first application and the second application may be executed in a first HOSI 1102 and a second HOSI 1104 based on different platforms (e.g., the first HOSI 1102 may operate in the Windows® platform and the second HOSI 1104 may operate in the Android® platform).

According to an embodiment of the disclosure, data generated in the first application of FIG. 11 may be shared with the second application of FIG. 11 at the request of the user. For example, data generated in the application of the Windows® platform may be shared with the e-mail application of the Android® platform. According to embodiments of the disclosure, when data is shared between applications executed in different platforms, the data may be shared without generating a copy of the data in a scene client of the device 100. This may reduce data usage and security risks on the network.

According to an embodiment of the disclosure, the user may transmit a data sharing request to the server 102 to share the data generated in the first application between the first application and the second application. In this case, the following process may be required to share the data between the applications executed in different platforms.

Upon receiving the data sharing request from the user, the server 102 may transmit a request 1106 for sharing the data with the first HOSI 1102 executing the first application on the server 102 and generating a report related to the first application. In this case, the report may include previously-executed records for the first application and data generated during the execution. Thereafter, the first HOSI 1102 may upload a report 1108 to the memory 202, and the memory 202 may return memory path information 1109 in the memory storing the report. When the memory path information is returned, the first HOSI 1102 may transmit the memory path information 1110 returned from the memory 202 to the server 102. Thereafter, in order to transmit the memory path information, the server 102 may determine in which HOSI (e.g., 312a) the second application is being executed, to determine that the second application is being executed in the second HOSI 1104 (1112). When determining that the second application is being executed in the second HOSI 1104, the server 102 may transmit memory path information 1114 received from the first HOSI to the second HOSI 1104. Thereafter, the second HOSI 1104 may download a report 1116 uploaded from the first HOSI 1102 in the memory 202 based on the memory path information.

Figure 12:
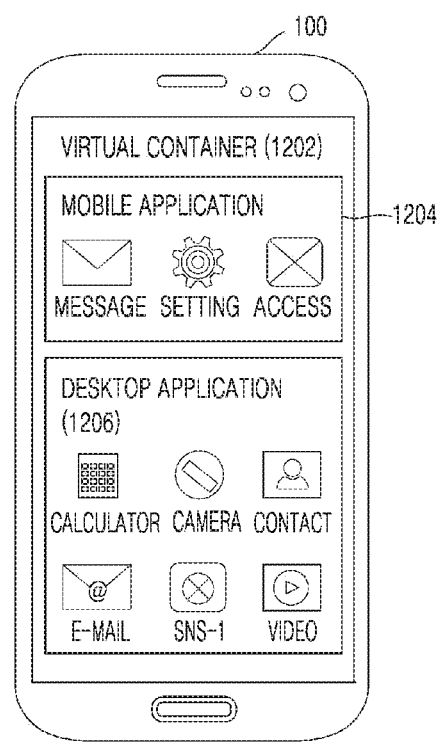
FIG. 12 is an example diagram illustrating a virtual container according to an embodiment of the disclosure.

FIG. 12 is an example diagram illustrating a virtual container according to an embodiment of the disclosure.

Referring to FIG. 12, a virtual container 1202 may be an application that may operate on the device 100 and may display all of at least one application executable on the server 102.

Because the virtual container 1202 may be displayed on the display of the device 100 and may display both a mobile application 1204 and a desktop application 1206 in a single view, the user of the device 100 may simply interact with the application. In this case, the displayed application may be based on the classification information classified by the server 102 based on at least one of the OS type or the device type. The application displayed in the virtual container 1202 may be changed in real time by updating the metadata related to the application executable on the server 102. The user may transmit an access request for a particular application to the server 102 by generating an event (e.g., clicking an icon) on the virtual container 1202.

Figure 13A:
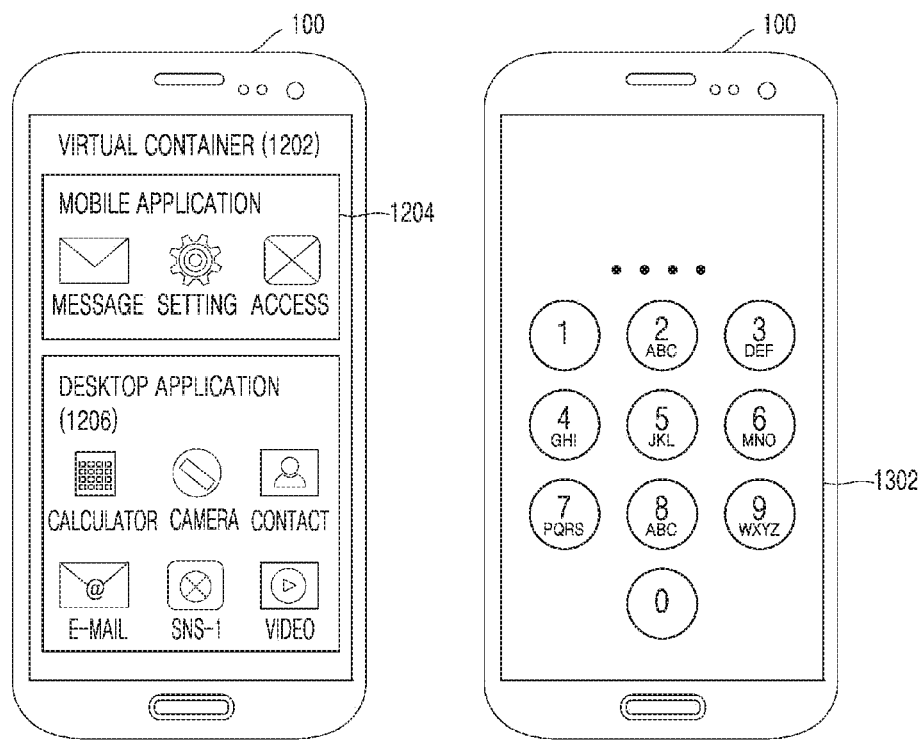
FIG. 13A is an example diagram in which an application is displayed on a display of a device, according to an embodiment of the disclosure.

FIG. 13A is an example diagram in which an application is displayed on a display of a device, according to an embodiment of the disclosure.

Referring to FIG. 13A, the virtual container 1202 may include a mobile application 1204 and a desktop application 1206. Also, the display of the device 100 may display a login UI 1302 when the user logs in the server 102. According to an embodiment of the disclosure, the login UI 1302 may be in the form of entering a password, but is not limited thereto.

Figure 13B:
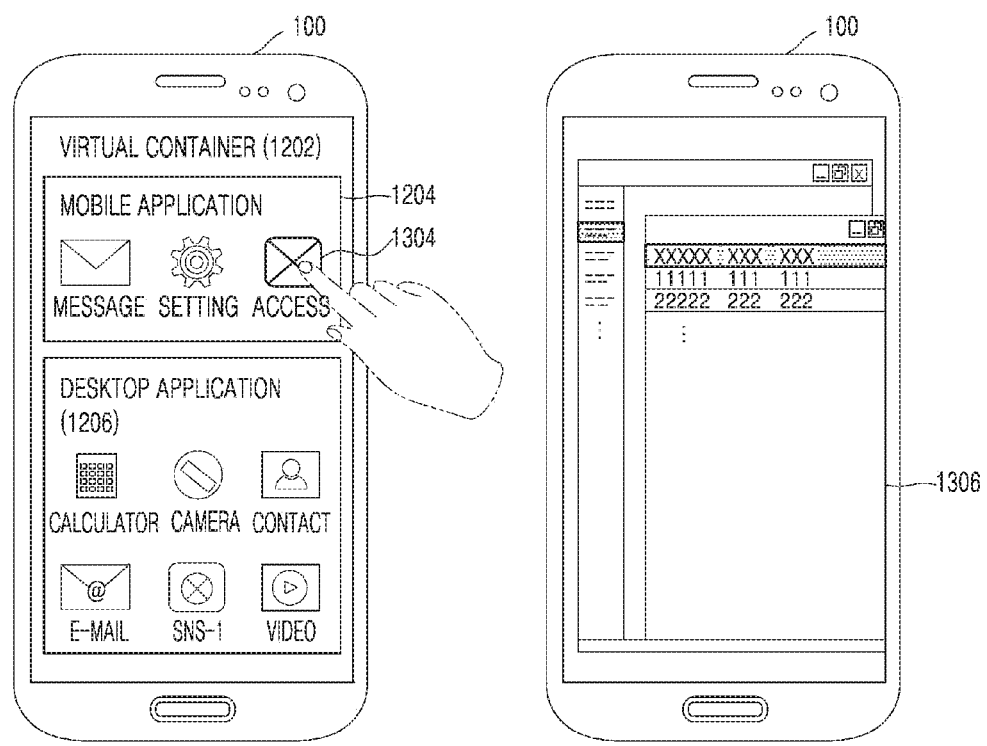
FIG. 13B is an example diagram in which an application is displayed on a display of a device, according to embodiment of the disclosure.

FIG. 13B is an example diagram in which an application is displayed on a display of a device, according to another embodiment of the disclosure.

Referring to FIG. 13B, the user may select an access application 1304 from among a mobile application 1204. According to the user's selection, the display of the device 100 may display a UI 1306 of the access application 1304 executed on the server 102.

Figure 13C:
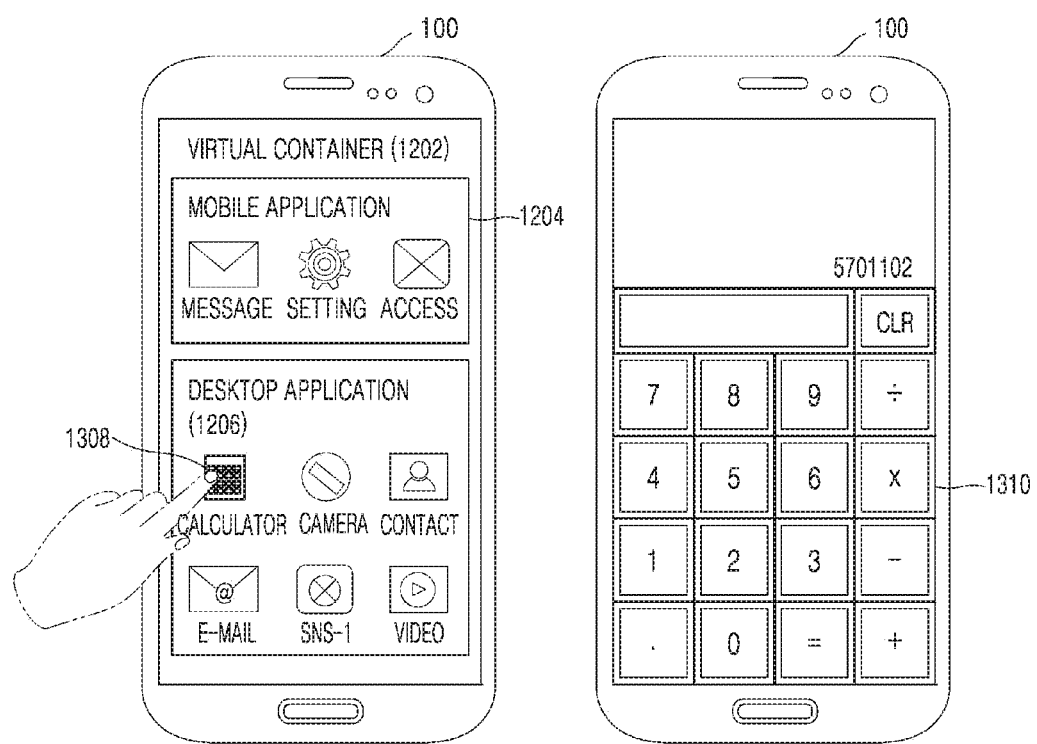
FIG. 13C is an example diagram in which an application is displayed on a display of a device, according to embodiment of the disclosure.

FIG. 13C is an example diagram in which an application is displayed on a display of a device, according to embodiment of the disclosure.

Referring to FIG. 13C, the user may select a calculator application 1308 from among a desktop application 1206. According to the user's selection, the display of the device 100 may display a UI 1310 of the calculator application 1308 executed on the server 102.

Figure 14:
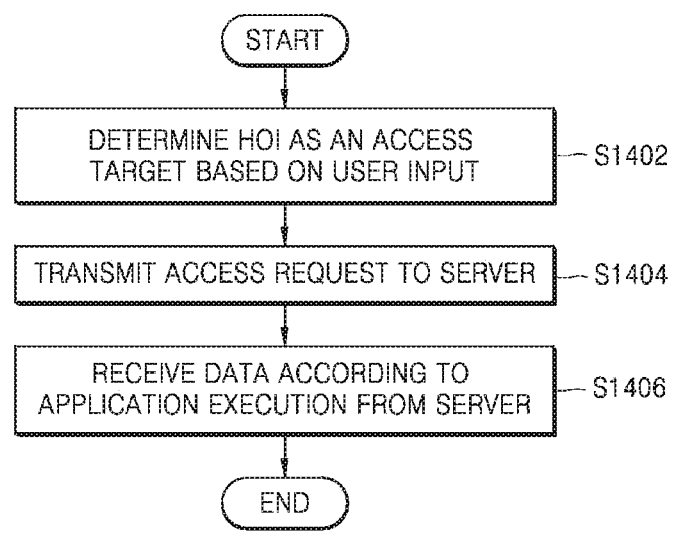
FIG. 14 is a flowchart illustrating a method by which a device handles access of an application, according to an embodiment of the disclosure.

FIG. 14 is a flowchart illustrating a method by which a device handles access of an application, according to an embodiment of the disclosure.

Referring to FIG. 14, the device 100 may determine an HOSI to be accessed, based on a user input (S1402). In this case, a user's input for accessing the HOSI (e.g., 312a) (e.g., clicking an icon displayed on the display of the device 100) may or may not include identification information of an application to be accessed.

Next, the device 100 may transmit an access request of the user to the server 102 (S1404). Upon receiving the user's access request, the server 102 may execute a particular application on the server 102 through operations S602 to S608 and transmit data according to the execution to the device 100.

Next, the device 100 may receive the data according to the execution of the application transmitted by the server 102 (S1406). Thereafter, the device 100 may display UI information corresponding to the received data on the display.

Figure 15:
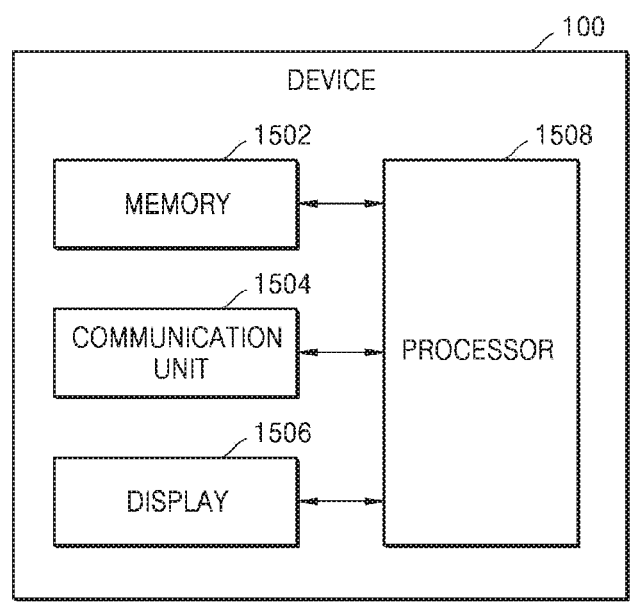
FIG. 15 is a block diagram illustrating a structure of a device according to an embodiment of the disclosure.

FIG. 15 is a block diagram illustrating a structure of a device according to an embodiment of the disclosure.

Referring to FIG. 15, the device 100 may include a memory 1502, a communicator 1504, a display 1506, and a processor 1508.

According to an embodiment of the disclosure, the memory 1502 may store data related to an application installed in the device 100 and may store data related to the virtual container 1202. The communicator 1504 may communicate with another device (not illustrated) or the server 102, and the display 1506 may display all data received from the server 102, including all UI information operating in the device 100. The processor 1508 may control the operation of the memory 1502, the communicator 1504, and the display 1506 of the device 100 (or another element when present) and may handle all computer computations in the device 100. In this case, the memory 1502, the communicator 1504, and the display 1506 may be connected to the processor 1508 to interact with the processor 1508 in order to receive data related to a control command.

According to the disclosure, the processor 206 may be implemented to perform the operation of the server described above with reference to FIGS. 1 to 15.

Also, according to the disclosure, the first device 1002 and the second device 1004 may correspond to the device 100, and the first HOSI 1102 and the second HOSI 1104 may correspond to the HOSI (e.g., 312a).

According to the disclosure, the communicator may perform communication with various types of external devices according to various types of communication methods. The communicator may include at least one of a Wi-Fi chip, a Bluetooth chip, a wireless communication chip, or a near field communication (NFC) chip.

The Wi-Fi chip and the Bluetooth chip may perform communication by a Wi-Fi method and a Bluetooth method, respectively. When the Wi-Fi chip or the Bluetooth chip is used, various connection information such as a service set identifier (SSID) and a session key may be first transmitted/received and various information may be transmitted/received after communication connection is performed by using the various connection information. The wireless communication chip may refer to a chip performing communication according to various communication standards such as Institute of Electrical and Electronics Engineers (IEEE), ZigBee, 3rd Generation (3G), 3rd generation partnership project (3GPP), and long term evolution (LTE). The NFC chip may refer to a chip operating in an NFC method using a 13.56 MHz band among various radio frequency identification (RF-ID) frequency bands such as 135 kHz, 13.56 MHz, 433 MHz, 860 to 960 MHz, and 2.45 GHz.

Embodiments of the disclosure may provide a method, device, and server for handling access of an application.

Also, embodiments of the disclosure may receive an access request to an HOSI from at least one user device.

Also, embodiments of the disclosure may identify at least one application to be accessed as a device is authenticated.

Also, embodiments of the disclosure may retrieve metadata related to at least one identified application.

Also, embodiments of the disclosure may classify and provide at least one identified application to a device.

Also, embodiments of the disclosure may share data between at least one application based on an instance of an application on an OS instance.

The embodiments of the disclosure have been described above with reference to the accompanying drawings. It will be understood by those of ordinary skill in the art that various changes in form and details may be made therein without departing from the spirit and scope of the disclosure as defined by the following claims. The embodiments of the disclosure are merely examples and should not be construed as limiting.

Meanwhile, the embodiments of the disclosure described above may be written as a program that may be executed in a computer, and the written program may be stored in a medium.

In the disclosure, the terms "computer program product" and "computer readable medium" are used to generally refer to media such as removable storage unit, a hard disk installed in hard disk drive, and signals. These computer program products are means for providing software to computer system. The disclosure is directed to such computer program products.

The medium may be any one that may continuously store computer-executable programs or temporarily store them for execution or download. Also, the medium may be any recording unit or storage unit in the form of a single hardware unit or a combination of hardware units, but is not limited to a medium directly connected to a computer system and may be distributed on a network. Examples of the mediums may include magnetic recording mediums such as hard disks, floppy disks, and magnetic tapes, optical recording mediums such as CD-ROMs and DVDs, magneto-optical recording mediums such as floptical disks, and storage mediums such as ROMs, RAMs, and flash memories that are configured to store program instructions. Also, as another example of the mediums, recording mediums or storage mediums may be managed by app stores distributing applications or by sites or servers supplying or distributing various other software.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling, by a server, access of an application, the method comprising:
   receiving, from a user device, a login request;
   authenticating the user device based on the received login request;
   generating a session for connection with the user device and generating a session token;
   receiving, from the user device, a request to access a hybrid operating system interface (HOSI) for managing at least one application executed respectively on different operating systems (OSs) by using the generated session token, wherein the request to access the HOSI comprises identification information of the application corresponding to the received request, from among the at least one application;
   determining, based on the identification information, the application corresponding to the request received from the user device, from among the at least one application;
   determining whether an instance of the determined application is activated on an OS instance of the server;
   streaming the determined application and transmitting a user interface (UI) corresponding to the instance of the determined application to the user device when the instance of the determined application is activated and activating the HOSI corresponding to the determined application, calling another instance of the OS corresponding to the determined application, streaming the determined application and transmitting the user interface (UI) to the user device when the instance of the determined application is deactivated;
   receiving a request for data sharing between the executed application corresponding to the received request and another application from the device;
   determining, according to the received request for data sharing, memory path information of a memory storing data generated by the executed application corresponding to the received request; and
   sharing the generated data with the other application based on the determined memory path information.

2. The method of claim 1, further comprising:
   classifying the at least one application based on at least one of an OS type or a device type; and
   transmitting classification information regarding the at least one application.

3. The method of claim 1, wherein the transmitting of the data according to the execution of the application corresponding to the received request comprises:
   receiving, from the user device, an event command for the executed application corresponding to the received request; and
   transmitting data processed based on the event command to the user device.

4. A method of controlling, by a user device, access of an application, the method comprising:
   transmitting a login request to a server;
   determining, based on a user input, a hybrid operating system interface (HOSI) for managing at least one application that is to be accessed and executed respectively on different operating systems (OSs);
   transmitting a request to access the determined HOSI to the server including the HOSI, wherein the request to access the HOSI comprises identification information of the application corresponding to the received request, from among the at least one application; and
   receiving, from the server, a streaming of the determined application and a user interface (UI) corresponding to an instance of the application when the instance of the determined application is activated and receiving an activation of the HOSI corresponding to the determined application, a call of another instance of the OS corresponding to the application, a streaming of the determined application, and the user interface (UI) when the instance of the determined application is deactivated; and
   transmitting, to the server, a request for data sharing between the activated application and another application, wherein the data is shared with the other application according to the request for data sharing based on memory path information of a memory storing data generated by the activated application.

5. A server for controlling access of an application, the server comprising:
a memory storing at least one instruction;
a communicator; and
at least one processor configured to execute the at least one instruction stored in the memory to:
control the communicator to receive, from a user device, a login request,
authenticate the user device based on the received login request,
generate a session for connection with the user device and generating a session token,
control the communicator to receive, from the user device, a request to access a hybrid operating system interface (HOSI) for managing at least one application executed respectively on different operating systems (OSs) by using the generated session token, wherein the request to access the HOSI comprises identification information of the application corresponding to the received request, from among the at least one application,
determine, based on the identification information, the application corresponding to the request received from the user device, from among the at least one application,
determine whether an instance of the determined application is activated on an OS instance of the server,
control the communicator to stream the determined application and transmit a user interface (UI) corresponding to the instance of the determined application to the user device when the instance of the determined application is activated and control the communicator to activate the HOSI corresponding to the determined application, call another instance of the OS corresponding to the determined application, stream the determined application and transmit the user interface (UI) to the user device when the instance of the determined application is deactivated,
control the communicator to receive a request for data sharing between the executed application and another application from the device,
determine, according to the received request for data sharing, memory path information of a memory storing data generated by the executed application, and
share the generated data with the other application based on the determined memory path information.

6. The server of claim 5, wherein the at least one processor is further configured to execute the at least one instruction stored in the memory to:
classify the at least one application based on at least one of an OS type or a user device type, and
control the communicator to transmit classification information regarding the at least one application.

7. The server of claim 5, wherein the at least one processor is further configured to execute the at least one instruction stored in the memory to:
control the communicator to receive, from the user device, an event command for the executed application and transmit data processed based on the event command to the user device.

* * * * *